United States Patent [19]

Cogger

[11] Patent Number: 4,945,943

[45] Date of Patent: Aug. 7, 1990

[54] COMPUTERIZED WATER FAUCET

[75] Inventor: John J. Cogger, Newport Beach, Calif.

[73] Assignee: Kolator Water Dynamics, Inc., Rochester, N.Y.

[21] Appl. No.: 339,164

[22] Filed: Apr. 17, 1989

[51] Int. Cl.$^5$ ............................................. F16K 11/24
[52] U.S. Cl. ........................................ 137/360; 4/192; 137/607; 236/12.12; 251/129.2; 251/230; 251/292
[58] Field of Search ............... 137/606, 607, 359, 360; 251/129.04, 129.20, 230, 292, 14; 236/12.12; 4/192

[56] References Cited

U.S. PATENT DOCUMENTS

| 2,706,492 | 4/1955 | Horland | 137/607 |
| 3,721,386 | 3/1973 | Brick et al. | 236/12.12 |
| 4,180,238 | 12/1979 | Muchow | 251/230 X |
| 4,629,157 | 12/1986 | Tsuchiya et al. | 251/292 X |
| 4,681,141 | 7/1987 | Wang | 137/607 |
| 4,682,728 | 7/1987 | Oudenhoven et al. | 236/12.12 |
| 4,696,428 | 9/1987 | Shakalis | 137/607 X |
| 4,700,884 | 10/1987 | Barrett et al. | 236/12.12 |
| 4,756,030 | 7/1988 | Juliver | 137/468 X |

FOREIGN PATENT DOCUMENTS 1413041 8/1965 France ............................ 251/129.04

OTHER PUBLICATIONS

Jennings, J. H., *IBM Technical Disclosure Bulletin*, vol. 22, No. 1 (Jun. 1979), "Pawl Actuator Valve Control".

Primary Examiner—Stephen M. Hepperle
Attorney, Agent, or Firm—Price, Gess & Ubell

[57] ABSTRACT

A water delivery control system that may be retrofitted to an existing water delivery fixture by simply removing the existing valve handles and then mounting the control system over the existing valve stems. The control system includes an external housing, a control panel on which an operator may select a desired temperature and pressure, and a valve actuator assembly including at least one electromechanical valve actuator and valve actuator linkage for coupling the valve actuator to an existing valve stem. The spatial arrangement of the valve actuator assembly is such that the valve actuator linkage will couple with an existing valve stem when the control system is surface mounted on the wall or countertop that surrounds the existing water delivery fixture.

17 Claims, 7 Drawing Sheets

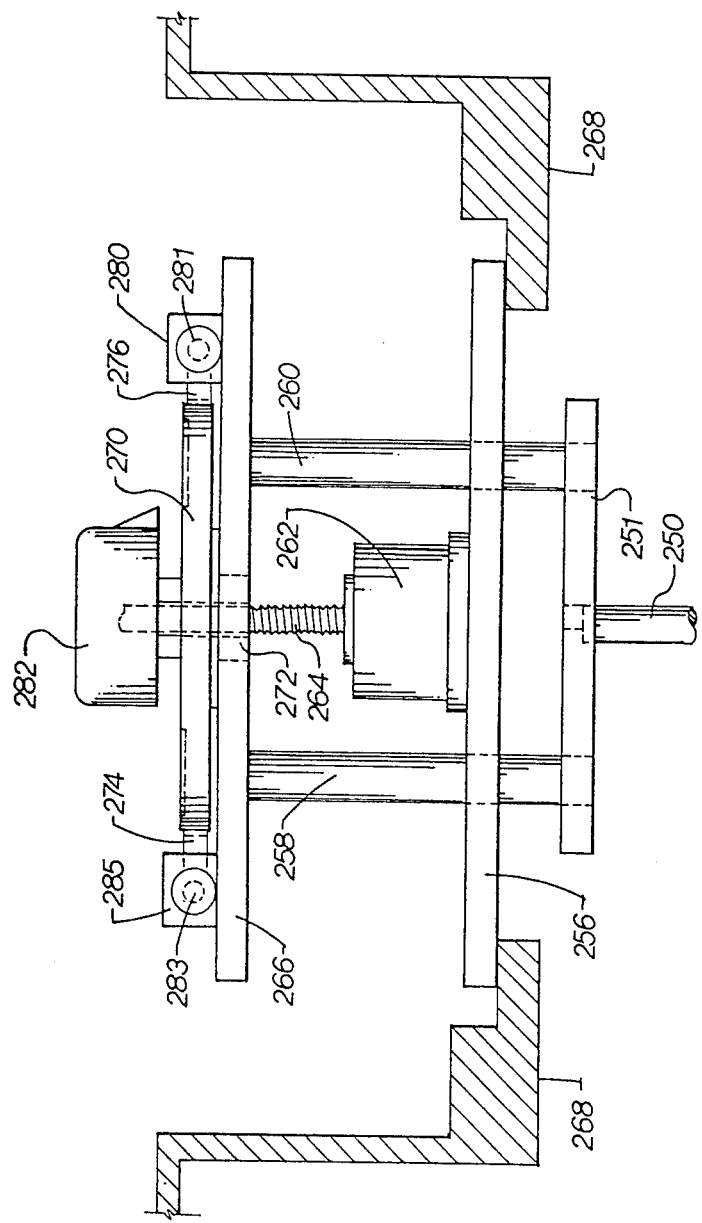

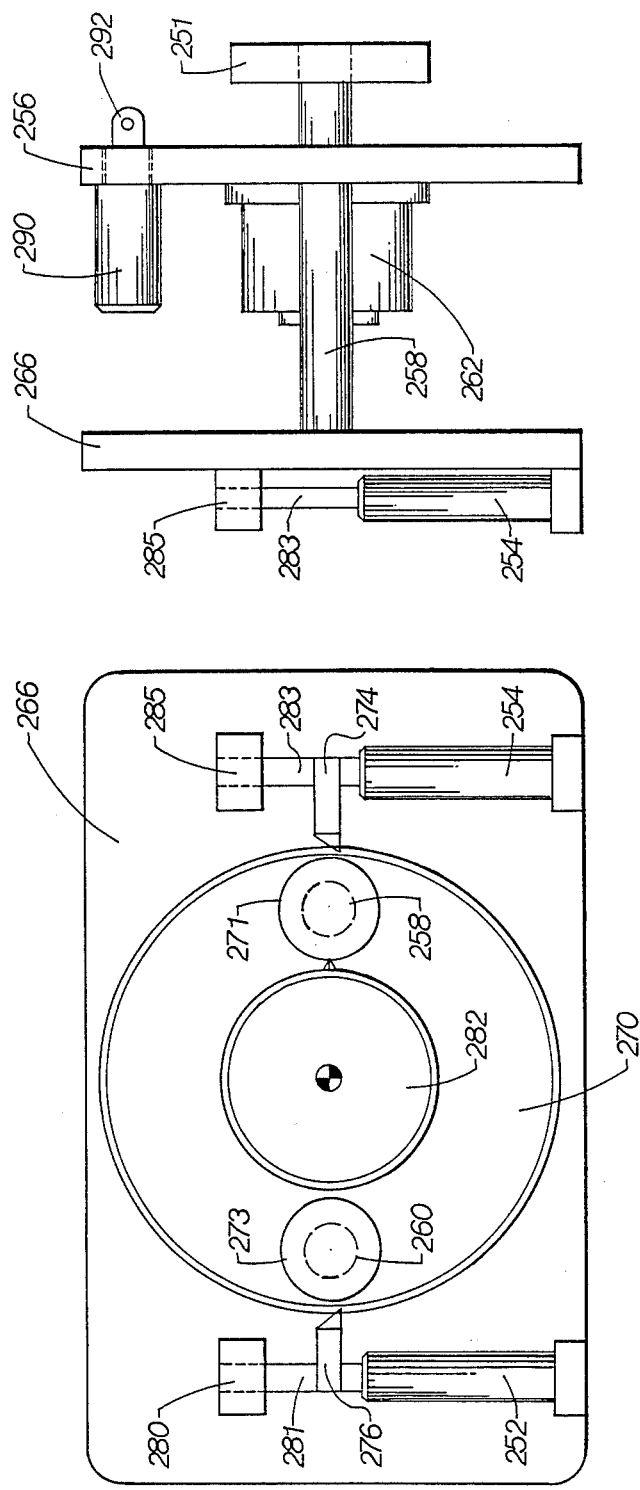

COMPUTERIZED WATER FAUCET

BACKGROUND OF THE INVENTION

1. Field of the Invention

The present invention generally relates to an electromechanical apparatus for automatically controlling the temperature and/or volume of water delivered by a standard bath or shower fixture.

2. Description of the Prior Art

Various devices have been developed for providing automatic control of the temperature and pressure of water provided by water delivery fixtures. For instance, several systems use a microprocessor for electronic control of water delivery systems. The prior art devices typically employ proportional servo valve control in order to regulate the water supply lines. Although effective from a control standpoint, these servo controls are expensive and overly complex for the task at hand. In addition to providing overly complex solutions to the problem of controlling temperature and pressure, the prior art systems are typically difficult to install in an already existing shower fixture. Therefore, the prior art systems do not offer a practical solution to a consumer who desires to install an automatic water control device after construction of the consumer's residence.

An exemplary prior art device is set forth in U.S. Pat. No. 4,700,884 which discloses an electronic fluid control system that employs a number of special mixing and diverting valves. While this prior art system offers a solution to the problem of automatic control, it is not a practical solution for the owner of an existing home since all of the control valves and diverters are intended to be installed upstream of the existing shower fixture. Hence, this system would require the consumer to engage in an expensive and demanding installation process that would likely require extensive modification of the plumbing that leads to the shower fixture. Such plumbing modification would in turn require disassembly of some portion of the walls.

One recently issued patent made an attempt at a solution to the above retro-fit problem. U.S. Pat. No. 4,756,030, entitled "Bathroom controller", discloses a fluid controller that can be installed in an existing plumbing system without disturbing the existing faucets and manual control valves or alternatively used in a new installation. This noninvasive installation is achieved by leaving the existing hot and cold valves fully open and simply installing control valves, sensors, and circuitry upstream so that there is no need to damage the tiles or other finish surrounding the bath fixture. The patent recognizes that the access to pipes required for installation will in most cases require removal of a portion of dry wall or other wall panelling. Hence, the solution provided by U.S. Pat. No. 4,756,030 is unsatisfactory because it merely moves the problematic installation upstream from the area of the existing fixture to a remote location.

SUMMARY OF THE INVENTION

The present invention solves the retrofit problems associated with the prior art water control systems by providing a temperature and pressure control system that can readily be installed in an existing bath or shower unit without requiring any disassembly or alteration of the tiles or other material surrounding the existing fixture. Furthermore, the present invention does not require any modification of the existing water delivery fixtures short of simple removal of the existing valve handles in order to couple the existing valve stems to a controller constructed in accordance with the present invention. Finally, while the present invention provides a unique and desirable solution to the problem of installing a water control system in an existing bathroom, the present invention is equally desirable for use in new construction.

The present invention allows for simple, nondestructive installation with standard preexisting hot and cold water supply valves by providing a valve actuator assembly including an external housing, at least one electromechanical valve actuator, and means for coupling the valve actuator to the valve stems. The spatial arrangement of the coupling means and the housing are arranged such that the coupling means may be coupled to the preexisting valve stems when the valve actuator housing is surface mounted on the wall or countertop so as to surround the existing hot and cold water supply valves and stems. The present invention further includes the necessary input means and control means responsive to the input means for controlling the valve actuator assembly in order to deliver water at the temperature and/or pressure set by the input means.

BRIEF DESCRIPTION OF THE DRAWINGS

The just-summarized invention will now be described in detail in conjunction with the drawings of which:

FIG. 5 is a top view of an alternative embodiment of a valve actuator assembly for use with a single valve water supply system.

FIG. 6 is a front view of the assembly of FIG. 5.

FIG. 7 is a side view of the assembly of FIGS. 5 and 6.

DETAILED DESCRIPTION OF THE PREFERRED EMBODIMENT

Figure 1:
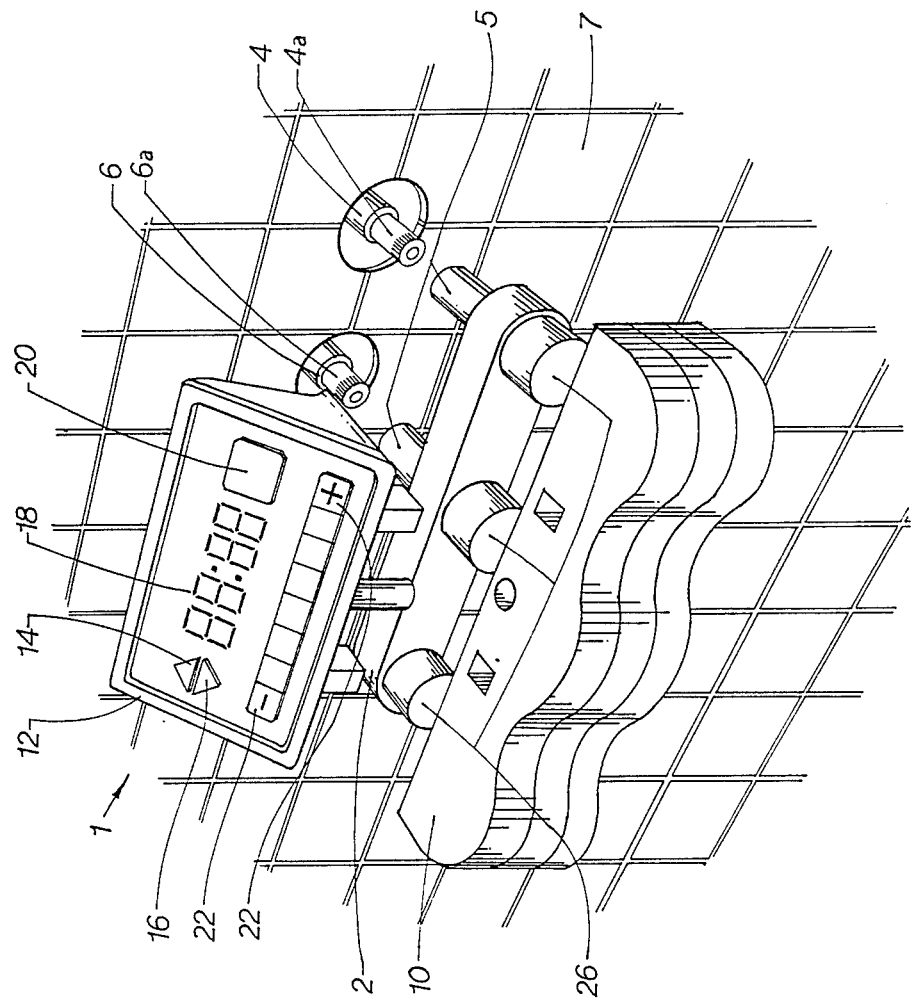
FIG. 1 is an exploded isometric diagram showing the relationship of a preferred embodiment of the present invention with respect to one possible configuration of preexisting water supply valves.

FIG. 1 is an exploded isometric diagram provided to show the manner in which the present invention may be retrofitted to an already existing water supply system generally specified by identifier number 8. More specifically, the temperature and pressure control system 1 of the present invention is intended to be installed in an existing bath or shower supply system 8 without requiring any substantial destruction or modification of the material 7 surrounding the water supply system 8 or of the water supply system 8 itself. In FIG. 1, the existing water supply system 8 consists of the cold water supply 4, the hot water supply (not shown), and the mixer/diverter valve 6.

FIG. 1 also depicts the various components of the temperature and pressure controller 1 of the present invention. In particular, the controller includes a valve actuator assembly 2 which contains electromechanical actuators which include coupling means 5 in order to effectuate control of the existing valve stems 4a, 6a. In the event of that the controller 1 fails to operate, control knobs 26 are provided to allow the user to manually set the temperature and pressure as normally accomplished with a standard shower fixture. The preferred embodiment depicted by FIG. 1 further includes a control panel 12 having a display 18 for displaying the desired temperature, the actual temperature, and/or the time of day. The user sets the desired temperature by operating up or down switches 14, 16 and sets the desired pressure by operating increase or decrease switches 22, 24 in a similar manner. An single on/off switch 20 is also provided in order to allow simple one touch operation of the controller. It is readily understood that the controller may contain memory means for storing the temperature and pressure set by the user with the appropriate switches 14, 16, 20, 22 whereby the user's desired settings may be automatically recalled upon actuation of the on/off switch 20. It is contemplated that the switches 14, 16, 20, 22 could be accompanied by braille markings in order to allow a nonsighted person to easily use the device. Cover plate 10 is merely for aesthetic purposes and may be easily removed in the event that access to the manual control knobs 26 is desired.

Other modifications and improvements are of course possible. For instance, in such applications as a hotel, a hospital, a laboratory or a rest home, a number of individual control assemblies according to the present invention could be externally controlled by a master controller. The master controller could have a monitoring and disabling capability. For example, such a controller could beneficially prevent the excessive use of hot water or maintain a maximum temperature level in order to prevent injury by users.

Figure 2:
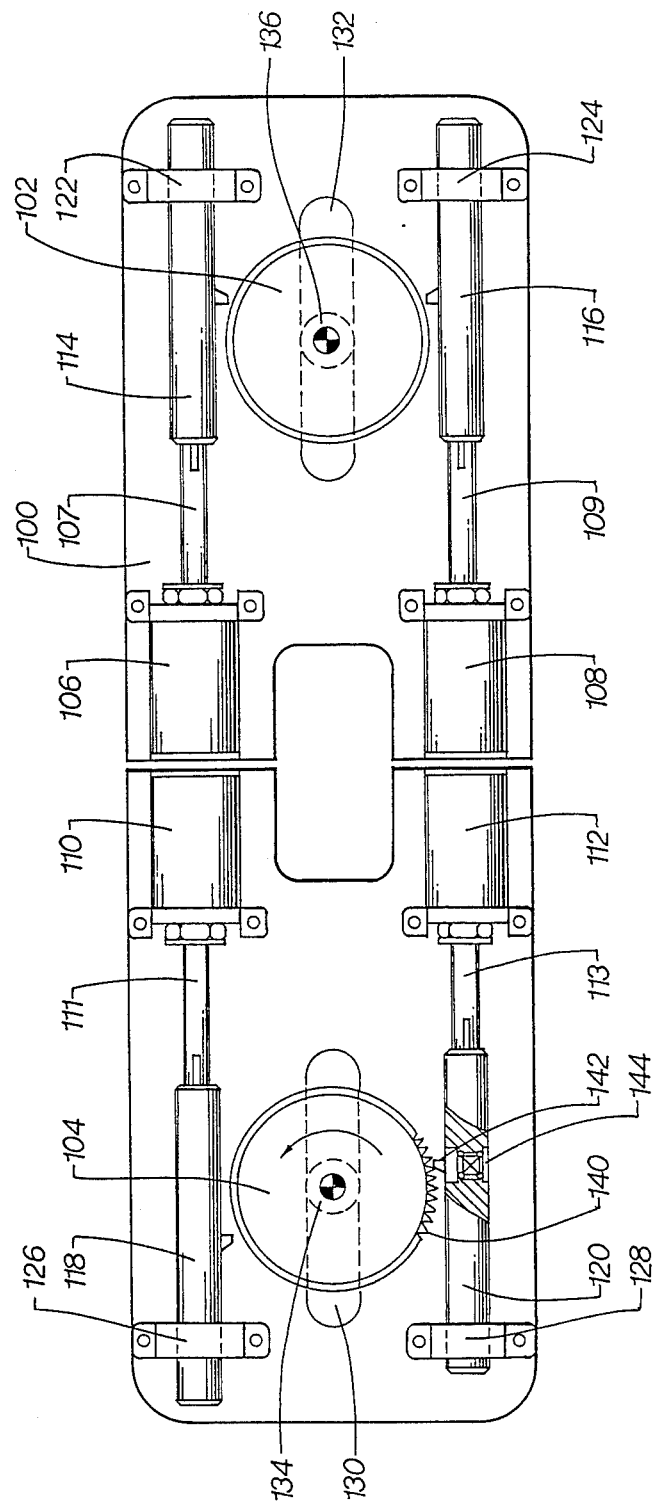
FIG. 2 is a diagram of a preferred embodiment of a valve actuator assembly.

FIG. 2 shows one possible embodiment of a valve actuator assembly according to the present invention wherein common pull type solenoids are arranged to react against two spur gears which are attached to the hot and cold water supply valves.

The valve actuator assembly is generally fastened to base plate 100 which has apertures 130, 132 thereon in order to provide access to the existing valve stems 134, 136 when the assembly is flush mounted on the wall behind which the valve stems 134, 136 are located. The valve actuator assembly of FIG. 2 further includes four pull-type solenoids 106, 108, 110, 112, which are fixedly mounted to the base plate 100. The shafts 107, 109, 111, 112 of the solenoids 106, 108, 110, 112 are connected to four pull rods 114, 116, 118, 120 which are movably supported by four pillow blocks 122, 124, 126, 128. Each pull rod 114, 116, 118, 120 contains a spring detented pawl in order to provide one-way engagement with the hot and cold spur gears 134, 136 when the solenoid connected to a particular pull rod is activated. The spur gears 134, 136 are fastened to the hot and cold water valve stems 134, 136 with set screws (not shown).

The operation of the valve actuator assembly will now be described in more detail with reference to solenoid 112 and the corresponding pull rod/spur gear assembly 120/104 attached thereto. When the control/display module 12 of FIG. 1 provides solenoid 112 with an activation pulse, the solenoid is energized and pulls its shaft 113 and the pull rod 120 inward. FIG. 2 depicts the position of the pull rod 120 in an energized position immediately following the pulling operation of the solenoid 112. When the solenoid 112 is operated so as to pull the pull rod 120 inward, the pawl 142, detented against the teeth 140 of the spur gear 104 by a spring 144, operates to translate the linear motion of the pull rod 120 into radial motion of the spur gear 104. In this case, the spur gear will be caused to move in a counter-clockwise direction. After cessation of the activation pulse, the pawl 142 is depressed into the pull rod 120 and solenoid 112 will to return to its non-energized position.

As shown by the position of the non-energized pull-rods 114, 116, 118, it is possible to ensure that the pawl and spring assembly of the respective pull rods are disengaged from the spur gear 102, 104. A collar type coupling (not shown) may be used to apply tension to the valve stem in order to prevent any valve movement while the solenoids are in the non-energized state. In the event of equipment malfunction, such an arrangement beneficially allows the user to manually operate the valves by merely overcoming the coupling tension provided by the collar type couplings.

Figure 3:
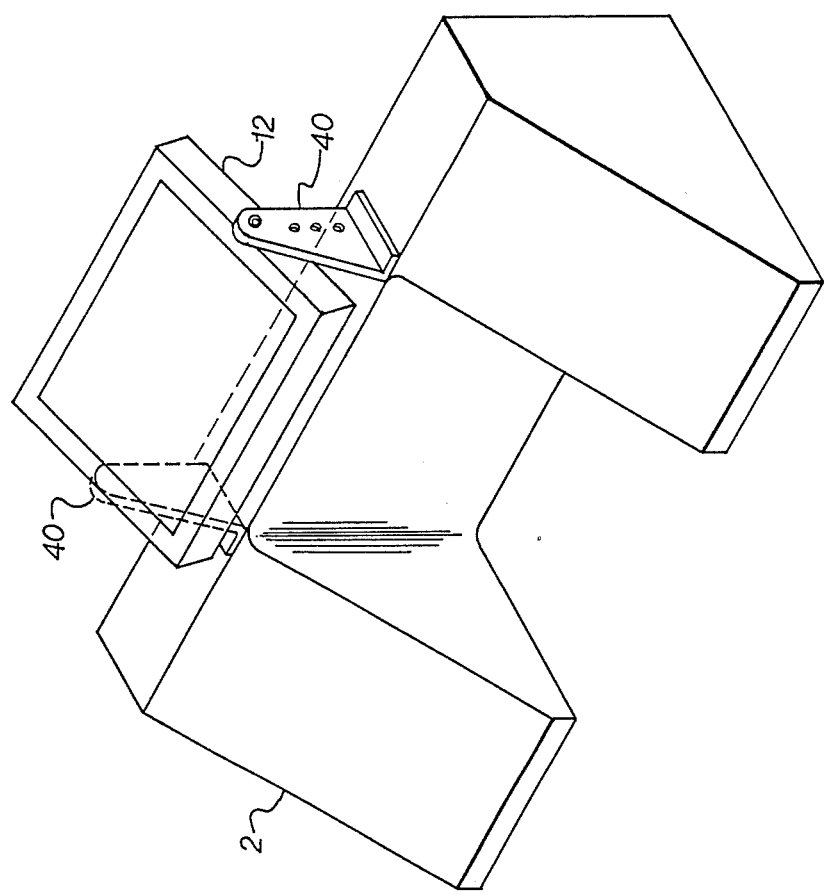
FIG. 3 is an isometric diagram of an alternative embodiment of the present invention.

FIG. 3 is an alternative preferred embodiment of a valve actuator assembly 2 and control panel 12 comprising a temperature and pressure controller system according to the present invention. In this embodiment, the control panel 12 is supported above the valve actuator assembly 2 by brackets 40.

Figure 4:
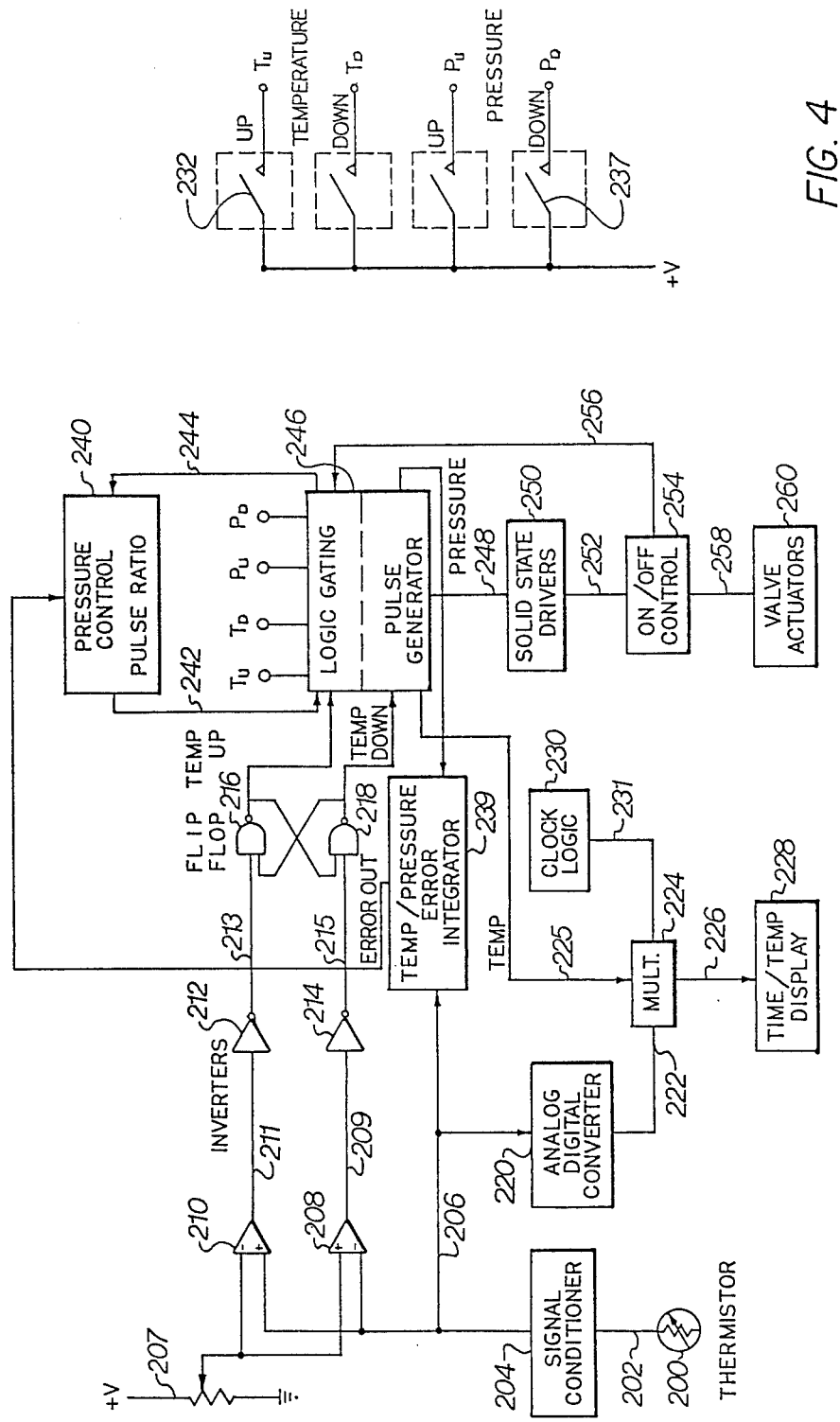
FIG. 4 is block diagram of the electronic control circuitry employed by the preferred embodiment of the present invention.

FIG. 4 presents a block diagram for a preferred embodiment of a control circuit for use with the temperature and pressure control system of the present invention. Operation of the circuit is as follows:

A logic gating and pulse generator circuit 246 is provided in order to control all system operations including the on/off control of the valve actuators 260, the multiplexing of the time/temperature display 228, and the provision of a frequency base for pressure control. When the circuit is initially powered on, the system goes to arbitrary preset levels of 50% pressure and 90 degrees Fahrenheit. The logic gating and pulse generator circuit 246 includes four inputs $T_u$, $T_d$, $P_u$, $P_d$ connected to four user touch switches 232, 234, 236, and 237, respectively. The touch switches may be used to override the default setting of temperature or pressure. For example, pushing the touch switch 232 connected to the $T_u$ input of the logic gating and pulse generator 246 would cause the pulse generator 246 to send an a signal on line 248 to a solid state driver 250 in order to operate a valve actuator 260 and increase the water temperature. The valve actuator 260 would correspond to a solenoid 106, 108, 110, 112 depicted in FIG. 2. An on/off control 254 responsive to the logic gating and pulse generator circuit 246 via control line 256 may be provided between the solid state driver 250 and the valve actuator 260 with lines 252 and 258 in order to provide full on and off control of the supply valves.

A temperature sensor consisting of a positive coefficient thermistor 200 is located so that its resistance is a function of the water temperature delivered to the user. The thermistor 200 signal is provided to a signal conditioning circuit 204 by line 202 which converts, conditions and scales the thermistor's output signal. The signal conditioning circuit 204 then provides a conditioned signal 206 to a positive input of comparator 210 and to the negative input of comparator 208. A positive input to comparator 208 and a negative input to comparator 210 are provided by the sweep arm of calibrating potentiometer 207, the output of the potentiometer having an adjustment range between ground and $+V$. Hence, the outputs of the comparators 208, 210 provide signals indicative of whether the conditioned temperature signal 206 is less than or greater than the calibration signal taken off the sweeper arm of potentiometer 207. If the conditioned signal 206 is greater than the calibration signal, the output of comparator 210 will be at +V and the output of comparator 208 will be at ground. If the conditioned signal 206 is less than the calibration signal, the output of comparator 210 will be at ground and the output of comparator 208 will be at +V. The output signals of the comparators 208, 210 are then provided to a pair of inverters 214, 212 by lines 209 and 211. The outputs of the inverters 214, 212 are provided on lines 215, 213 as inputs to a pair of NAND gates 216, 218 wired as a flip-flop. The outputs of the flip-flop comprised of NAND gates 216 and 218 provides the logic gating and pulse generating circuit 246 with "Increment Temp" and "Decrement Temp" control signals that represent the action necessary to maintain a desired temperature.

The conditioned temperature signal 206 is also provided as one of two inputs to temperature/pressure error integrator 239, the other input being provided by the logic gating and pulse generator circuit 246. The pressure/temperature error integrator 239 controls the pressure while maintaining a constant temperature by integrating the conditioned temperature signal 206 and the pressure signal and provides an "error out" signal to the pressure control/pulse ratio circuit 240. The pressure control/pulse ratio circuit 240 is provided with an input from the control circuitry 246 and returns a signal on line 242 representative of the pressure differential between the pressure requested by the user with touch switches 236, 237 and the reference frequency of the pulse generator 246.

The conditioned temperature signal is also provided as an input to A/D converter 220, the output of the A/D converter then being provided to one input of 2 to 1 multiplexer 224. The other input of multiplexer 224 is provided by clock circuit 230 on line 231. The logic gating and pulse generator circuit 246 provides a multiplex control signal to the multiplexer on line 225 in order to allow alternatively display either timer or temperature on the user display 228 via line 226.

By employing low power consumption devices, the necessary power for operation of the circuit illustrated in FIG. 4 may be provided with ordinary batteries. However, it may be desireable in some circumstances to employ a typical transformer and bridge rectifier 120 volts AC to DC supply circuit.

An alternative preferred embodiment of a valve actuator assembly according to the present invention is set forth in FIGS. 5,6,7 and 8. FIG. 5 illustrates an embodiment of the present invention that is designed for use with a water delivery fixture having a single valve. In such a fixture, the user turns the valve on or off and controls volume by moving the valve 250 in or out. The user controls the water temperature by rotating the valve 250 clockwise or counterclockwise as desired.

The push/pull operation of the assembly shown in FIG. 5 will now be described. The valve actuator assembly comprises a base plate 256 attached to an enclosure 268 and having a motor 262 mounted thereon. The motor 262 is equipped with a lead screw 264, the lead screw 264 being connected to a half nut 272 pressed in, or otherwise suitable connected to, a translation plate 266. A spur gear 270 is rotatable mounted to the translation plate 266 such that the spur gear 270 is free to rotate about its center but may not move linearly. A pair of translation rods 258, 260 are fixedly mounted to the spur gear 270 at locations 271 and 273, respectively. The translation rods 258, 260 are connected to a coupling plate 251 through apertures in the translation plate 266 and the base plate 256. The center of the coupling plate 251 is connected to the valve 250.

When an appropriate control signal is provided to the motor 262, the lead screw 264 is rotated, and the half nut 272 and translation plate 266 are caused to move linearly. Hence, the rotational movement of the motor 262 is translated into linear movement by the interaction of the half nut 272 and the lead screw 264. This linear movement is then provided to the valve stem 250 via the translation plate, the spur gear 270, the translation rods 258, 260 and the coupling plate 251.

Figure 8:
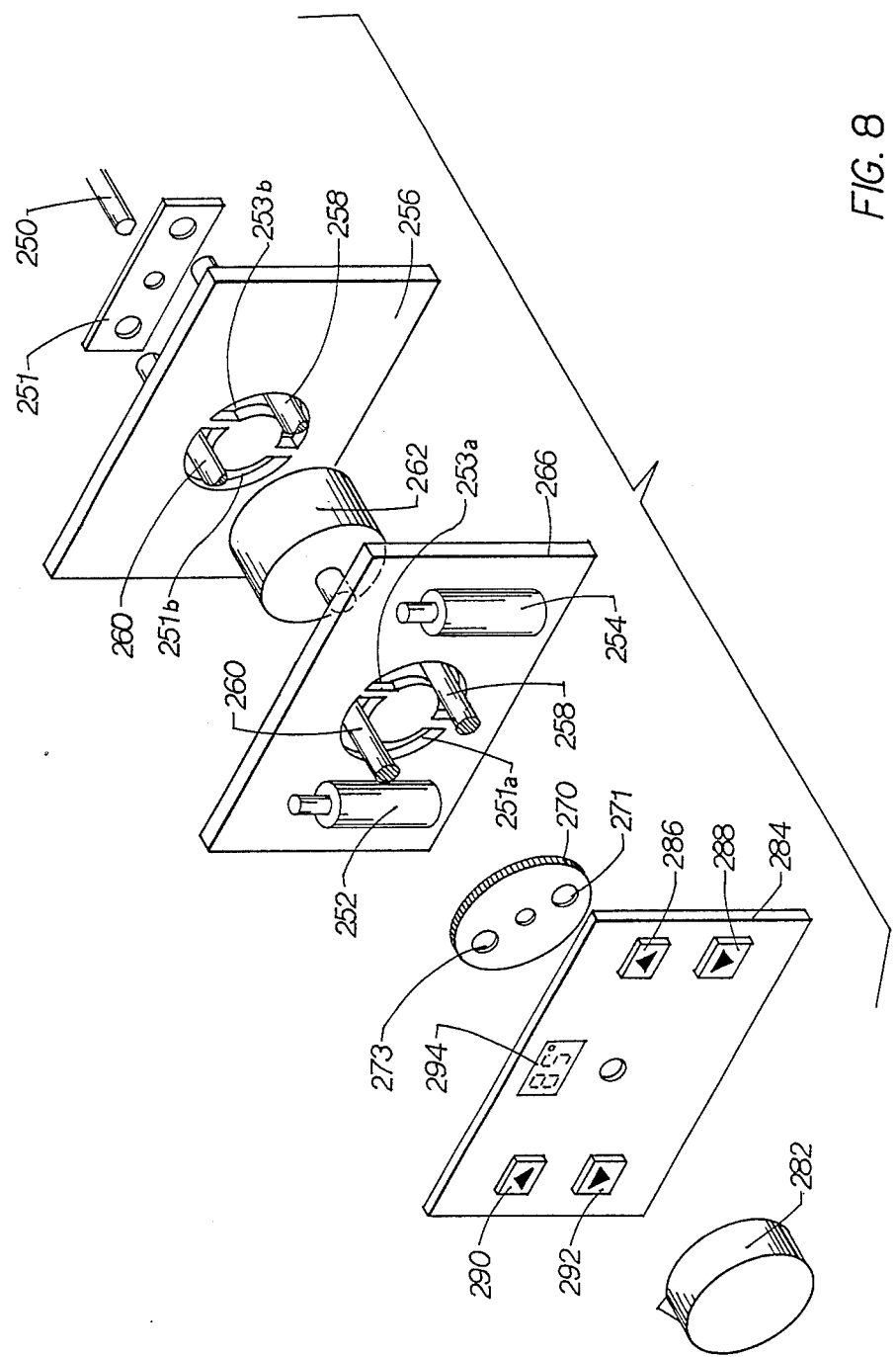
FIG. 8 is an exploded isometric diagram of the assembly of FIGS. 6, 7 and 8.

Rotational movement of the assembly is best understood with reference to FIGS. 6 and 8. As shown therein, a pair of solenoids 252, 254 having rod 281, 283, pawl 276, 274, and pillow block assemblies 280, 285, respectively, are fixedly attached to the translation plate 266. The solenoids 252, 254 are arranged on opposite sides of the spur gear 270 and in such a manner that the pawls 274, 276 extend inward and engage the teeth of the spur gear 270 when the solenoid is activated. As previously described, the spur gear 270 is connected to the coupling plate 251 via a pair of translation rods 258, 260. The translation rods 258, 260 extend through a pair of circumferential apertures 251a and 253a in the translation plate 266 and through a corresponding pair of apertures 251b and 253b in the base plate 256. The translation rods 258, 260 are free to move about a circular path within the confines of the apertures 251a, 251b, 253a, and 253b. Thus, referring to FIG. 6, when solenoid 254 is operated, the pawl 274 engages the teeth of spur gear 270 and causes the spur gear 270 to rotate clockwise. As the translation rods 258, 260 are connected to the spur gear 270, the clockwise rotational motion is translated to the valve stem 250 via the translation rods 258, 260 and the coupling plate 251. Operation of solenoid 252 will cause the valve stem 250 to be rotated in a counterclockwise direction in a similar fashion.

The valve actuator assembly of FIGS. 5,6,7 and 8 may be further provided with a cover plate 284 having volume control buttons 290, 292, temperature control buttons 286, 288 and a time and/or temperature display 294. A manual override knob 282 may also be provided in the event that the assembly malfunctions.

As shown FIG. 7, a solenoid 290 having an apertured extension 292 may be provided to allow for control of a standard diverter valve (not shown). the apertured extension 292 is simply connected to the diverter valve mechanism via an appropriate linkage (not shown).

As will be apparent to those skilled in the art, various modifications and adaptations of the preferred embodiment may be made without departing from the scope and spirit of the invention. It is therefore understood that, within the scope of the appended claims, the invention may be practiced other than as specifically described herein.

What we claim is:

1. A water control system for use with preexisting water supply fixture having at least one valve accessible through at least one preexisting aperture in a wall or countertop comprising:
   input means for allowing a user to set a desired water temperature or pressure;
   a valve actuator assembly including at least one electromechanical valve actuator and means for coupling the valve actuator to the valve, the spatial arrangement of the coupling means being such that the coupling means may be coupled to the preexisting valve when the valve actuator assembly is mounted on the wall or countertop so as to surround the preexisting aperture, and control means responsive to the input means for controlling the valve actuator assembly in order to deliver water at the temperature and/or pressure set by the input means.

2. The water control system of claim 1 wherein the valve actuator assembly further comprises:

a base plate having at least one aperture whereby an existing pair of hot and cold water supply valve stems are accessible through the aperture of the base plate when the base plate is surface mounted on the wall;

first and second gears operatively connected to the respective hot and cold water supply valve stems such that each gear is located on the side of the base plate away from the wall and lies in a plane substantially parallel to the plane of the base plate;

a first pair of rod and pawl assemblies for co-acting with the first gear, each assembly movably mounted to the base plate, substantially parallel with the plane of the base plate, and located on opposite sides of the first gear, whereby movement of one rod and pawl assembly causes the first gear to rotate in one direction to open the valve and movement of the other rod and pawl assembly causes the gear to rotate in the opposite direction to close the valve;

a second pair of rod and pawl assemblies for co-acting with the second gear, each assembly movably mounted to the base plate, substantially parallel with the plane of the base plate, and located on opposite sides of the second gear, whereby movement of one rod and pawl assembly causes the second gear to rotate in one direction to open the valve and movement of the other rod and pawl assembly causes the second gear to rotate in the opposite direction to close the valve, and two pairs of solenoids responsive to the control means and operatively connected to one of the rod and pawl assemblies whereby a predetermined rod and pawl assembly may be operated to open or close a respective valve in order to control pressure and/or temperature.

3. The water control system of claim 1 further comprised of an electromechanical actuator means for control of a standard bath/shower diverter valve.

4. The water control system of claim 1 wherein the input means comprises:

temperature input means for setting the desired temperature;

pressure input means for setting the desired pressure, and display means for displaying the desired temperature and/or pressure set with the temperature and/or pressure input means.

5. The water control system of claim 1 wherein the display means further comprises means for displaying the time of day.

6. The water control system of claim 1 wherein the temperature input means comprises first and second switches whereby operation of the first switch will cause the control means to raise the water temperature and operation of the second switch will cause the control means to lower the water temperature.

7. The water control system of claim 1 wherein the pressure input means comprises first and second switches whereby operation of the first switch will cause the control means to increase the water pressure and operation of the second switch will cause the control means to decrease the water pressure.

8. The water control system of claim 1 wherein the control means includes a memory means for storing and recalling the temperature and/or pressure last set by the user via the input means.

9. A temperature/volume control system for use with a standard water distribution system having hot and cold water supply valves and valve stems comprising:

input means for allowing a user to set a desired temperature and/or pressure of water supplied by the distribution system;

a base plate having at least one aperture whereby the hot and cold water supply valve stems are accessible through the aperture of the base plate when the base plate is surface mounted on the wall so that the plane of the base plate is substantially perpendicular to the hot and cold water supply valve stems;

first and second gears operatively connected to the respective hot and cold water supply valve stems such that each gear is lies in a plane substantially parallel to the plane of the base plate;

a first pair of rod and pawl assemblies for co-acting with the first gear, the assemblies located on opposite sides of the first gear, whereby movement of one rod and pawl assembly causes the first gear to rotate in one direction to open the valve and movement of the other rod and pawl assembly causes the gear to rotate in the opposite direction to close the valve;

a second pair of rod and pawl assemblies for co-acting with the second gear, the assemblies located on opposite sides of the second gear, whereby movement of one rod and pawl assembly causes the second gear to rotate in one direction to open the valve and movement of the other rod and pawl assembly causes the second gear to rotate in the opposite direction to close the valve;

two pairs of solenoids, each solenoid operatively connected to one of the rod and pawl assemblies whereby a predetermined rod and pawl assembly may be operated to open or close a respective valve in order to control pressure and/or temperature, and control means responsive to the input means for controlling the solenoids in order to deliver a predetermined temperature and volume of water in accordance with the operator input.

10. The temperature/volume control system of claim 9 wherein the rod and pawl assemblies are arranged so that the pawls do not contact the gears when the solenoids are not activated whereby the valves may be manually operated by the user.

11. The temperature/volume control system of claim 9 wherein the first and second gears are operatively connected to the existing valve stems with set screws.

12. The temperature/volume control system of claim 9 further comprised of an electromechanical actuator means for control of a standard bath/shower diverter valve.

13. The temperature/volume control system of claim 9 wherein the input means comprises:

temperature input means for setting the desired temperature;

pressure input means for setting the desired pressure, and display means for displaying the desired temperature and/or pressure set with the temperature and/or pressure input means.

14. The temperature/volume control system of claim 13 wherein the display means further comprises means for displaying the time of day.

15. The temperature/volume control system of claim 13 wherein the temperature input means is comprised of first and second switches whereby operation of the first switch will cause the control means to raise the water temperature and operation of the second switch will cause the control means to lower the water temperature.

16. The temperature/volume control system of claim 13 wherein the pressure input means is comprised of first and second switches whereby operation of the first switch will cause the control means to increase the water pressure and operation of the second switch will cause the control means to decrease the water pressure.

17. The temperature/volume control system of claim 9 wherein the control means includes a memory means for storing and recalling the temperature and/or pressure last set by the user via the input means.

* * * * *